US006912603B2

(12) United States Patent
Kanazashi

(10) Patent No.: US 6,912,603 B2
(45) Date of Patent: Jun. 28, 2005

(54) TRANSMITTING APPARATUS AND METHOD OF CONTROLLING FLOW THEREOF

(75) Inventor: Kazuyuki Kanazashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 09/969,958

(22) Filed: Oct. 3, 2001

(65) Prior Publication Data

US 2002/0186655 A1 Dec. 12, 2002

(30) Foreign Application Priority Data

Jun. 8, 2001 (JP) ...................................... 2001-174020

(51) Int. Cl.[7] .............................................. G06F 3/00
(52) U.S. Cl. ...................................... 710/29; 370/229
(58) Field of Search ..................... 710/29, 30; 370/229, 370/232, 468

(56) References Cited

U.S. PATENT DOCUMENTS

| 5,644,577 | A | | 7/1997 | Christensen et al. |
|---|---|---|---|---|
| 5,719,853 | A | | 2/1998 | Ikeda |
| 5,802,040 | A | * | 9/1998 | Park et al. ................... 370/232 |
| 6,128,278 | A | * | 10/2000 | Joffe et al. ................... 370/229 |
| 6,438,138 | B1 | * | 8/2002 | Kamiya ....................... 370/468 |
| 6,466,541 | B1 | * | 10/2002 | Peck ........................... 370/229 |

FOREIGN PATENT DOCUMENTS

| JP | 08223174 | 8/1996 |
|---|---|---|
| JP | 10271132 | 10/1998 |
| JP | 06097983 | 4/2004 |
| WO | 00/74282 | 12/2000 |

OTHER PUBLICATIONS

Takanaka, et al., "Evaluation of Flow Control Schemes For Packet Switched Network" Evolutions in Computer Communications, Kyoto 26–29; Sep. 1978; International Conference on Computer Communication, vol. 4, pp. 141–146; XP000809782.

* cited by examiner

Primary Examiner—Jeffrey Gaffin
Assistant Examiner—Harold Kim
(74) Attorney, Agent, or Firm—Katten Muchin Rosenman

(57) ABSTRACT

Disclosed is a transmitter apparatus which creates a PI frame (Pause-In frame) and a PO frame (Pause-Out frame) and transmits each frame to a router for executing flow control. When creation of a PI frame is commanded from a band controller, or when a flow-control start request is detected from a signal that enters from a transmission line, the transmitter apparatus sends a PI frame to a router to allow execution of flow control. When creation of a PO frame is commanded from the band controller and, moreover, a flow-control halt request is detected from a signal that enters from the transmission line at such time that the router is performing flow control, the transmitting apparatus creates the PO frame and sends it to the router to halt flow control.

11 Claims, 9 Drawing Sheets

TRANSMITTING APPARATUS AND METHOD OF CONTROLLING FLOW THEREOF

BACKGROUND OF THE INVENTION

Field of the Invention

This invention relates to a transmitting apparatus and to a method of controlling the flow thereof. More particularly, the invention relates to a transmitting apparatus, and to a flow control method thereof, through which an externally entered flow-control-related frame (a frame requesting start of flow control and a frame requesting halt of flow control) is allowed to pass without being processed and an external device such as a router is allowed to execute flow control.

A recent market trend is greater use of low-cost GbE (Gigabit Ethernet) for transmission of gigabit-class data. If GbE is used for routers or the like, there is an increase in requests for connection by GbE to SONET (Synchronous Optical Network) transmitters that construct a wide-area network connected to the router. It is desired to make the SONET transmitter appear as an SW-HUB as seen from the router and to make the connection between remote routers appear as if it were constructed by an Ethernet network. A technique provided to achieve this is to place a MAC frame, which is used in Ethernet, on a SONET. Simply stated, the above is achieved by encapsulating the MAC frame in a PPP (Point-to-Point Protocol) frame used in SONET.

Ethernet and SONET are different culturally and the definition of data transmission speed over these networks is 10/100/1000 (Mbps) in case of Ethernet and 55/155/622/2488 (Mbps) in case of SONET. If it is attempted to exchange data between networks that thus differ in transmission speed, e.g., if an attempt is made to use OC12 (622 Mbps) to connect a 1-Gbps Ethernet to a SONET, the band is limited to about 400 Mbps because a transmission band of only 622 Mbps is available with respect to the input of 1 Gbps. An operation for limiting this band shall be referred to as "band control" below.

In a case where band control is applied, a large-capacity buffer is provided for temporarily accumulating the entered data (frame) in such a manner that the data will not be discarded. In addition, it is necessary to provide a flow control function in which when the buffer is about to overflow, the external device to which the data is input is requested to halt the transfer of the data. By way of example, IEEE 802.3x provides for such flow control. When it is required to halt the transfer of data between connected devices, IEEE 802.3x prevents the inflow of excessive data by outputting a special frame, called a PAUSE frame, to the device on the other end. Further, since frame control itself halts the flow of data, it is necessary that the device that receives the PAUSE frame buffer data until the transfer of data is resumed. Furthermore, it is necessary to request the sender of this data to halt the output of the PAUSE frame as necessary. In summary, therefore, a large-capacity buffer for band control and flow control is provided in ordinary circumstances and, if the buffer is about to overflow owing to band control or the like, transfer of data is controlled by using flow control such as the PAUSE frame with respect to the sender of the data. In other words, flow control is executed between the router and the transmitting apparatus.

FIG. 7 is a block diagram showing part of a transmitting system useful in describing flow control according to the prior art. The system includes routers 10, 20 and SONET transmitters 30, 40. The routers are connected to the transmitters by a high-speed Ethernet, e.g., GbE, and the transmitters are connected to each other by an OC12 optical transmission line constructing a SONET. The router 10 has fast Ethernet ports 11a, 11b, . . . and is connected to the high-speed Ethernet via these ports. The router 10 further includes a switch 12 for sending a frame (a MAC frame) by routing it to a prescribed network using a routing table or filtering table, not shown. The fast Ethernet port 11b is provided with an input buffer 13, an output buffer 14 and a band control/flow control unit, which is not shown.

The transmitter 30 has a buffer & band controller 31, a MAC frame terminating/discriminating unit 32, a PPP & SONET unit 33, a switch 34 for performing STS switching, an OC12 interface 35 and a buffer & MAC frame creation unit 36.

The buffer & band controller 31 successively stores IEEE 802.3 MAC frames, which enter from the router, in an internal buffer 31a for band control/pause control, as shown in FIG. 8, reads data out of this buffer at a speed that conforms to OC12, and inputs this data to the MAC frame terminating unit 32. As shown in FIG. 9, the IEEE 802.3 MAC frame is composed of (1) a preamble Prea⁻ for establishing synchronization, (2) a frame start limiter SFD, (3) a destination address DA, (4) a source address SA, (5) a logical link control header LLC, (6) a subnetwork access protocol header SNA, (7) an IP header IP, (8) data (information) and (9) a frame check sequence FCS. By making the destination address DA a special code, the MAC frame can be made a frame (Pause-In Frame) PI that requests start of flow control and a frame (Pause-Out Frame) PO that requests halt of flow control.

The buffer & band controller 31 has a band controller 31b for monitoring the amount of data accumulated in the buffer 31a, instructing the buffer & MAC frame creation unit 36 to create the frame PI for requesting start of flow control if the amount of data accumulated exceeds a first set value, and instructing the buffer & MAC frame creation unit 36 to create the frame PO for requesting halt of flow control if the amount of data accumulated is less than a second set value (which is smaller than the first set value).

The frame terminating/discriminating unit 32 has a MAC frame termination 32a for terminating the MAC frame upon deleting the preamble Prea⁻ and start frame limiter SFD from the data read out of buffer 31a, a pause-frame discriminator 32b for discriminating the pause-in frame (the frame that requests the start of flow control) PI and the pause-out frame (the frame that requests halt of flow control) PO, instructing the buffer & MAC frame creation unit 36 to halt transmission of the MAC frame if the PI frame is detected and instructing the buffer & MAC frame creation unit 36 to start transmission of the MAC frame if the PO frame is detected.

The PPP & SONET unit 33 adds, e.g., a PPP (Point-to-Point Protocol) header onto the MAC frame that enters from the frame terminating/discriminating unit 32, thereby obtaining an RFC1662 frame (see FIG. 10), assembles this into a packet, which is the unit of switching in the STS (Synchronous Transfer Structure) switch 34 of the next stage, and outputs the result. The PPP & SONET unit 33 deletes the PPP header and footer from the packet that enters from the STS switch 34 and inputs the result to the buffer & MAC frame creation unit 36. The RFC1662 frame has a structure the same as that of an unnumbered information frame of an HDLC, as shown in FIG. 10. More specifically, the RFC1662 frame is obtained by adding an HDLC header and a protocol number Protoc onto the MAC frame and adding on an HDLC footer as the footer. The HDLC header includes a flag sequence Flag, an address portion ADD and a control portion Control, and the HDLC footer includes a frame check sequence FCS and a flag sequence Flag. The protocol number Protoc indicates the protocol number of (1) a network layer protocol (Internet Protocol, AppleTalk, etc.), (2) a network control protocol (IPCP, ATCP, etc.) and (3) a data-link control protocol (Link Control Protocol, Password Authentication Protocol, etc.), etc.

The OC12 interface 35 sends each packet that enters from the STS switch 34 to the optical transmission line upon mapping the packet to the payload of an OC12 optical synchronization frame (POS: Packet Over Sonet), and demaps a frame, which is the unit of switching of the STS switch, from the payload of a POS-format OC12 optical synchronization frame that enters from the optical transmission line and outputs the result.

As shown in FIG. 8, the buffer & MAC frame creation unit 36 has a large-capacity buffer 36a, a pause-frame creation unit 36b, a MAC-frame creation unit 36c and a combiner 36d. The large-capacity buffer 36a buffers data that enters from the PPP & SONET unit 33, and the pause-frame creation unit 36b creates the pause-in frame (the frame that requests the start of flow control) PI and the pause-out frame (the frame that requests halt of flow control) PO based upon a command from the band controller 31b. The MAC-frame creation unit 36c reads data out of the buffer 36a successively at a speed that conforms to the high-speed Ethernet, creates an IEEE 802.3 MAC frame and outputs the frame. Further, the MAC-frame creation unit 36c controls the creation/transmission of the MAC in accordance with a command from the pause-frame discriminator 32b. The combiner 36d combines the frames created by the pause-frame creation unit 36b and MAC-frame creation unit 36c and sends the result to the high-speed Ethernet.

Flow Control

The band controller 31b of the buffer & band controller 31 monitors the amount of data accumulated in the buffer 31a and instructs the buffer & MAC frame creation unit 36 to perform PI frame creation if the amount of MAC frame inflow from the router 10 increases and the amount of accumulated data exceeds the first set value. In response, the pause-frame creation unit 36b of the buffer & MAC frame creation unit 36 creates the PI frame and sends it to the router 10.

Upon detecting the PI frame, the router 10 halts the transmission of the MAC frame to the transmitter 30. As a result, the amount of data accumulated in the buffer 31a of transmitter 30 decreases. If the amount of accumulated data falls below the second set value, the band controller 31b instructs the buffer & MAC frame creation unit 36 to create the PO frame. In response, the buffer & MAC frame creation unit 36 creates the PO frame and sends it to the router 10. Upon detecting the PO frame, the router 10 starts sending the MAC frame to the transmitter 30.

If the amount of data accumulated in the buffer 13 exceeds the first set value, the router 10 sends the PI frame to the transmitter 30. Upon discriminating the PI frame, the pause-frame discriminator 32b of the frame terminating/discriminating unit 32 in transmitter 30 instructs the buffer & MAC frame creation unit 36 to stop sending the MAC frame. As a result, the buffer & MAC frame creation unit 36 halts the transmission of the MAC frame to the router 10 and buffers the data that enters from the PPP & SONET unit 33 in the large-capacity buffer 36a.

If as a result of the foregoing operation the amount of data that has accumulated in the buffer 13 of router 10 decreases and falls below the second set value, the router 10 creates the PO frame and sends this frame to the transmitter 30. Upon discriminating the PO frame, the pause-frame discriminator 32b of the frame terminating/discriminating unit 32 in the transmitter 30 instructs the buffer & MAC frame creation unit 36 to start sending the MAC frame. As a result, the buffer & MAC frame creation unit 36 resumes the creation of the MAC frame and the transmission of the MAC frame to the router 10.

There is now demand for a reduction in the scale of the circuitry constructing the transmitting apparatus. This is being achieved by minimizing the capacity of the buffer 36a in the buffer & MAC frame creation unit 36. If the capacity of the buffer 36a is minimized, however, a situation arises in which the data that enters from the PPP & SONET unit 33 can no longer be stored in the buffer 36a from the moment the transmission of the MAC frame is halted by the PI frame from the router 10 to the moment the transmission of the MAC frame is resumed by the PO frame. The result is that this data will be discarded. Even when flow control is carried out in the above-described manner, the discarding of data cannot be prevented if the buffer capacity is too small.

SUMMARY OF THE INVENTION

Accordingly, an object of the present invention is to so arrange it that flow control is possible even with a small-capacity buffer and so that discarding of data at the time of flow control can be prevented.

Another object of the present invention is to so arrange it that flow-control malfunction will not occur even when an externally applied PAUSE frame and a PAUSE frame from within the apparatus are generated in an overlapping manner. Specifically, when a router is being allowed to perform flow control by an externally applied PI frame and a PI frame from within the apparatus, the object is to prevent flow-control malfunction by instructing the router to halt flow control in response to generation of both the externally applied PO frame and PO frame from within the apparatus.

First Aspect of the Invention

According to a first aspect of the present invention, the foregoing objects are attained by providing a transmitting apparatus having a buffer for storing frame data that enters from an external device, a transceiver for subjecting data read out of the buffer to predetermined transmit processing and sending the processed data to a transmission line, and for subjecting a signal that enters from a transmission line to predetermined receive processing and outputting the processed signal, and a frame creation unit for putting the data output from the receive side of the transceiver into the form of a frame and sending the frame to the external device, the apparatus (1) monitoring amount of data stored in the buffer and commanding that a flow-control start request frame be created when the amount of stored data has exceeded a first set value; (2) creating a flow-control start request frame and sending it to the external device when the command enters or when a flow-control start request signal enters from the transmission line, and causing the external device to execute flow control; and (3) when a flow-control start request frame enters from the external device, sending a flow-control start request signal to the transmission line and causing the external device on the receiving side to execute flow control. Thus, an externally applied flow-control request is allowed to pass and an external device is caused to execute flow control. As a result, even if the buffer in the transmitting apparatus is of small capacity, flow control is possible. Moreover, the discarding of data at the time of flow control can be prevented.

Second Aspect of the Invention

According to a second aspect of the present invention, the foregoing objects are attained by providing a transmitting apparatus having a buffer for storing frame data that enters from an external device, a transceiver for subjecting data read out of the buffer to predetermined transmit processing and sending the processed data to a transmission line, and for subjecting a signal that enters from a transmission line to predetermined receive processing and outputting the processed signal, and a frame creation unit for putting the data output from the receive side of the transceiver into the form of a frame and sending the frame to the external device, the apparatus (1) monitoring amount of data stored in the buffer and commanding that a flow-control start request frame and a flow-control halt request frame be created appropriately based upon the amount of stored data and that these frames be sent to the external device; (2) detecting a flow-control start request and a flow-control halt request from a signal that enters from a transmission line; (3) creating a flow-control start request frame and sending it to the external device when creation of the flow-control start request frame is commanded or when the flow-control start request is detected from the signal that enters from the transmission line; and (4) if the external device is performing flow control, creating a flow-control halt request frame and sending it to the external device when creation of the flow-control halt request frame has been commanded and, moreover, the flow-control halt request has been detected from the signal that enters from the transmission line.

Thus, when a router is being caused to execute flow control, the router is commanded to halt flow control by generation of both the externally applied flow-control halt request and the flow-control halt request from within the apparatus. As a result, it can be so arranged that flow-control malfunction will not occur even if an externally applied flow-control request and a flow-control request from within the apparatus are produced in an overlapping manner.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) First Embodiment (a) Overall Structure FIG. 1 is a block diagram showing part of a transmitting system according to a first embodiment of the present invention. The system includes routers 100, 200 and SONET transmitters 300, 400. The routers are connected to the transmitters by a high-speed Ethernet, e.g., GbE, and the transmitters are connected to each other by an optical transmission line constructing a SONET. The router 100 has fast Ethernet ports 101, 102, . . . and is connected to the high-speed Ethernet via these ports. The router 100 further includes a switch 111 for sending a frame (MAC frame) by routing it to a prescribed network using a routing table or filtering table, not shown. The fast Ethernet port 102 is provided with an input buffer/band controller/pause terminator 121 and an output buffer/pause-frame inserter/flow controller 122. The router 200 has a structure identical with that of the router 100 though only the a input buffer/band controller/pause terminator 221 and output buffer/pause-frame inserter/flow controller 222 are illustrated.

(b) Structure of Transmitting Apparatus

Figure 1:
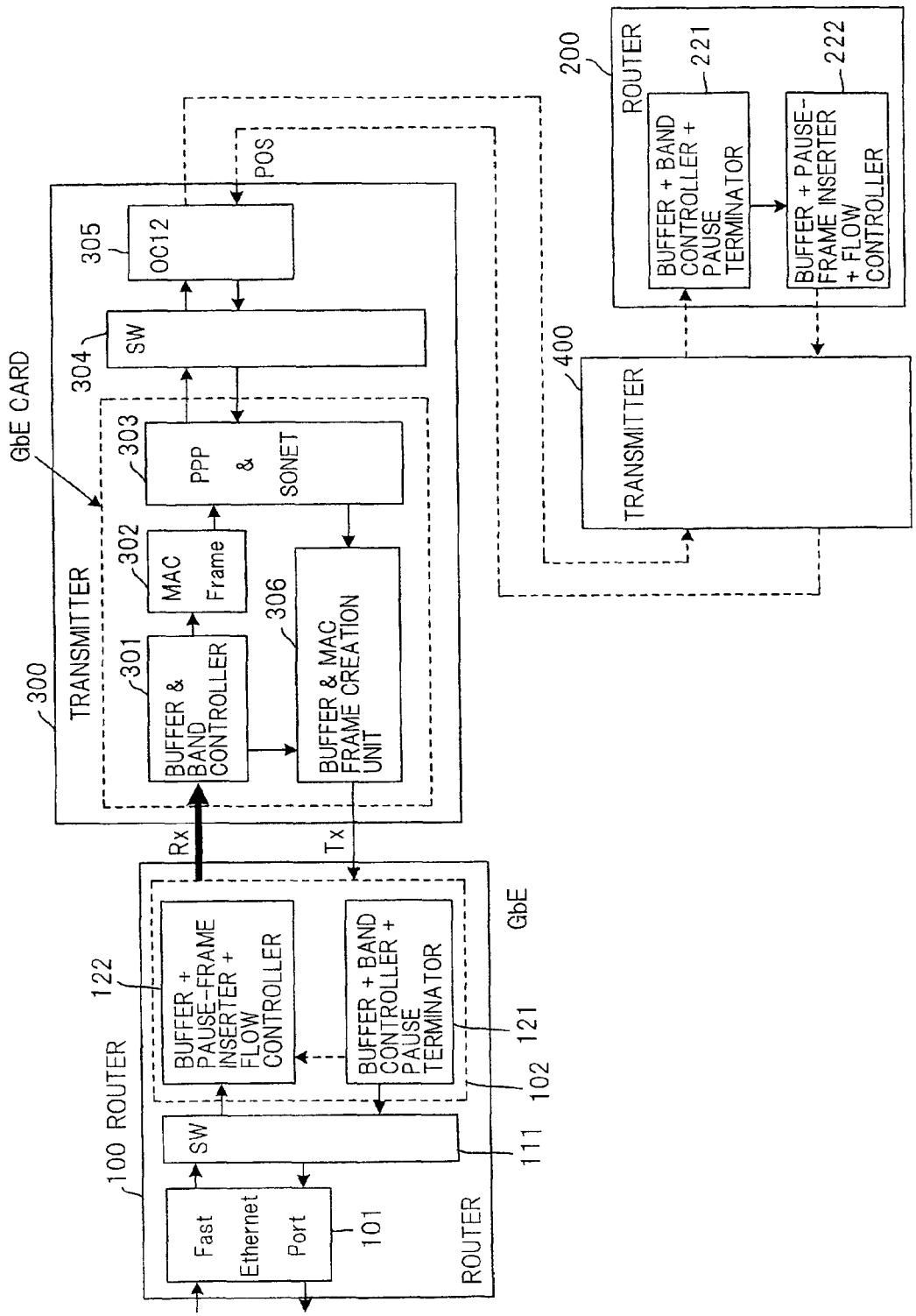
FIG. 1 is a block diagram showing part of a transmitting system according to a first embodiment of the present invention.

The transmitter 300 has a buffer & band controller 301, a MAC frame terminating unit 302, a PPP & SONET unit 303, a switch 304 for performing STS switching, an OC12 interface 305 and a buffer & MAC frame creation unit 306.

Figure 2:
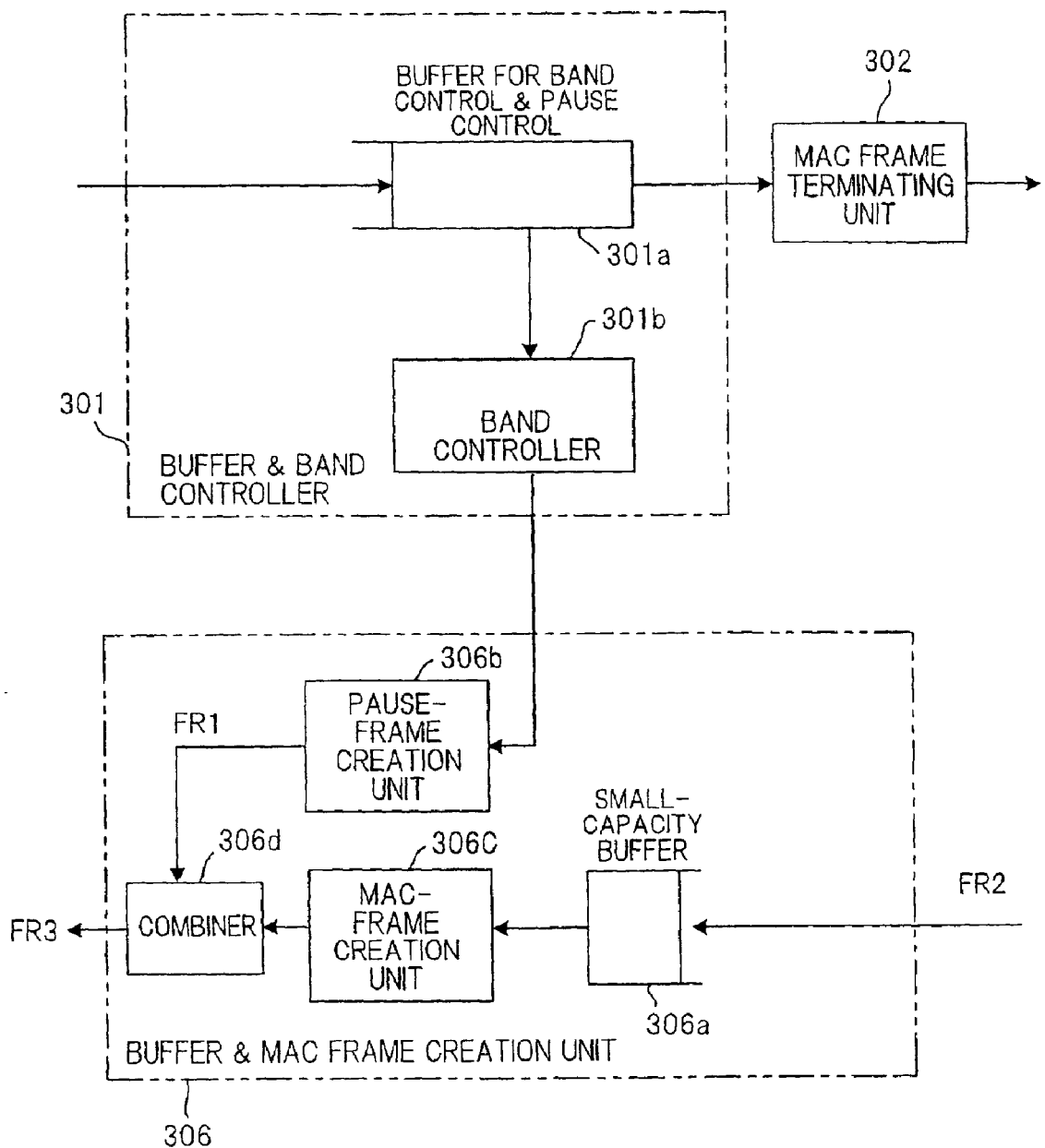
FIG. 2 is a block diagram showing the principal components of a transmitting apparatus according to the first embodiment.
Figure 9:
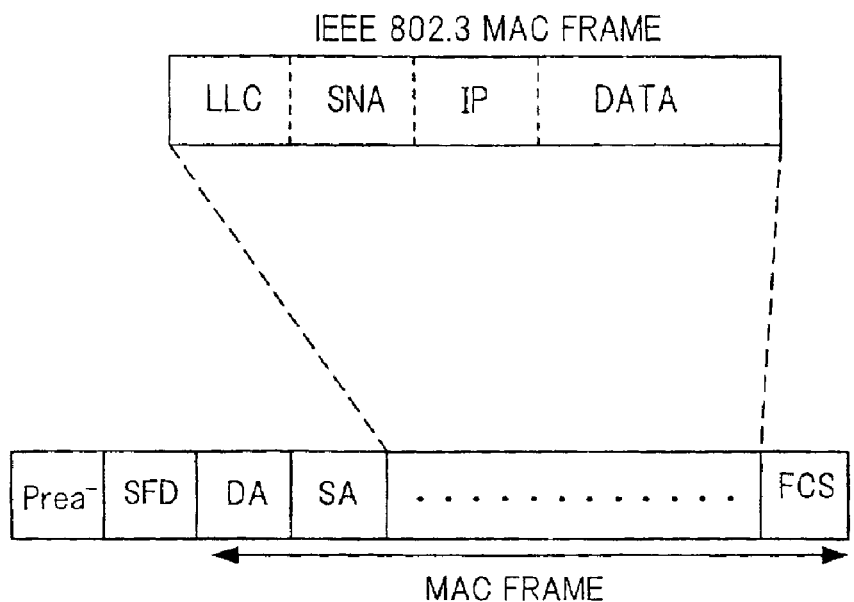
FIG. 9 is a diagram showing the structure of an IEEE802.3 MAC frame according to the prior art.

The buffer & band controller 301 successively stores IEEE 802.3 MAC frames (see FIG. 9), which enter from the router, in an internal buffer 301a for band control/pause control, as shown in FIG. 2, reads data out of this buffer at a speed that conforms to OC12, and inputs this data to the MAC frame terminating unit 302. Further, the buffer & band controller 301 has a band controller 301b for monitoring the amount of data accumulated in the buffer 301a, instructing the buffer & MAC frame creation unit 306 to create the frame PI for requesting start of flow control if the amount of data accumulated exceeds a first set value, and instructing the buffer & MAC frame creation unit 306 to create the frame PO for requesting halt of flow control if the amount of data accumulated is less than a second set value (which is smaller than the first set value).

Figure 10:
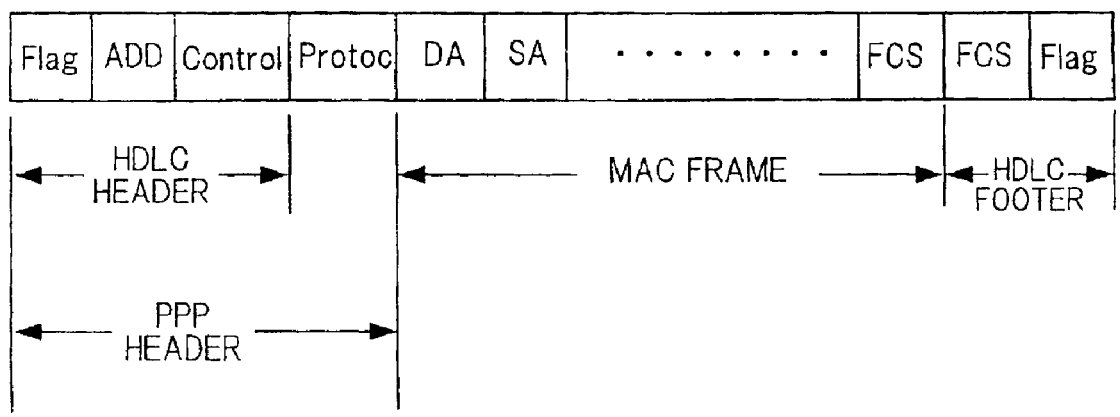
FIG. 10 is a diagram useful in describing an RFC1662 frame.

The frame terminating unit 302 terminates the MAC frame upon deleting the preamble Prea⁻ and start frame limiter SFD from the data read out of buffer 301a. The PPP & SONET unit 303 adds, e.g., a PPP (Point-to-Point Protocol) header onto the MAC frame that enters from the frame terminating/discriminating unit 302, thereby obtaining an RFC1662 frame (see FIG. 10), assembles this into a packet, which is the unit of switching in the STS (Synchronous Transfer Structure) switch 304 of the next stage, and outputs the packet. The PPP & SONET unit 303 deletes the PPP header and footer from the packet that enters from the STS switch 304 and inputs the result to the buffer & MAC frame creation unit 306.

The OC12 interface 305 sends each packet that enters from the STS switch 304 to the optical transmission line upon mapping the packet to the payload of an OC12 optical synchronization frame, and demaps a frame, which is the unit of switching of the STS switch, from the payload of a POS-format OC12 optical synchronization frame that enters from the optical transmission line and outputs the result.

As shown in FIG. 2, the buffer & MAC frame creation unit 306 has a small-capacity buffer 306a, a pause-frame creation unit 306b, a MAC-frame creation unit 306c and a combiner 306d. The small-capacity buffer 306a buffers data that enters from the PPP & SONET unit 303, and the pause-frame creation unit 306b creates the pause-in frame (the frame that requests the start of flow control) PI and the pause-out frame (the frame that requests halt of flow control) PO based upon a command from the band controller 301b. The MAC-frame creation unit 306c reads data out of the buffer 306a successively at a speed that conforms to the high-speed Ethernet, creates an IEEE 802.3 MAC frame and outputs the frame.

(c) Flow Control of Transmitting Apparatus by Band Control

The band controller 301b of the buffer & band controller 301 monitors the amount of data accumulated in the buffer 301a and instructs the buffer & MAC frame creation unit 306 to perform PI frame creation if the amount of MAC frame inflow from the router 100 increases and the amount of accumulated data exceeds the first set value. In response, the buffer & MAC frame creation unit 306 creates the PI frame and sends it to the router 100. Upon detecting the PI frame, the router 100 halts the transmission of the MAC frame to the transmitter 300. More specifically, upon detecting the PI frame, the buffer/band controller/pause terminator 121 of the router 100 instructs the buffer/pause-frame inserter/flow controller 122 on the output side to halt the transmission of the MAC frame.

If as a result of the foregoing operation the amount of data that has accumulated in the buffer 301a of the transmitter 300 decreases and falls below the second set value, the band controller 301b instructs the buffer & MAC frame creation unit 306 to create the PO frame. In response, the buffer & MAC frame creation unit 306 creates the PO frame and sends it to the router 100. Upon detecting the PO frame, the router 100 starts sending the MAC frame to the transmitter 300. More specifically, upon detecting the PO frame, the buffer/band controller/pause terminator 121 of the router 100 instructs the buffer/pause-frame inserter/flow controller 122 on the output side to start sending the MAC frame. In response to being instructed to start transmission, the buffer/pause-frame inserter/flow controller 122 starts sending the MAC frame to the transmitter 300.

(d) Flow Control in Response to Request from Router 100

The buffer/band controller/pause terminator 121 of router 100 performs monitoring to determine whether the amount of data that has accumulated in its internal buffer has exceeded the first set value. If the amount of accumulated data has exceeded the first set value, then the buffer/band controller/pause terminator 121 instructs the buffer/pause-frame inserter/flow controller 122 on the output side to create the PI frame. In response, the buffer/pause-frame inserter/flow controller 122 creates the PI frame and sends it in the direction of the transmitter 300. The transmitters 300, 400 allow the PI frame to pass and do not terminate it. As a result, the PI frame arrives at the router 200 on the receiving side. Upon detecting the PI frame, the buffer/band controller/pause terminator 221 instructs the buffer/pause-frame inserter/flow controller 222 to halt transmission of the MAC frame. In response to being instructed to halt this transmission, the buffer/pause-frame inserter/flow controller 222 halts the transmission of the MAC frame. As a result, input of the MAC frame to the router 100 stops.

The buffer/band controller/pause terminator 121 of router 100 performs monitoring to determine whether the amount of data that has accumulated in its internal buffer has fallen below the second set value. If the amount of accumulated data has fallen below the second set value because the MAC frame has stopped arriving, then the buffer/band controller/pause terminator 121 instructs the buffer/pause-frame inserter/flow controller 122 on the output side to create the PO frame. In response, the buffer/pause-frame inserter/flow controller 122 creates the PO frame and sends it in the direction of the transmitter 300. The transmitters 300, 400 allow the PO frame to pass and do not terminate it. As a result, the PO frame arrives at the router 200 on the receiving side. Upon detecting the PO frame, the buffer/band controller/pause terminator 221 instructs the buffer/pause-frame inserter/flow controller 222 to start transmission of the MAC frame. In response to being instructed to start this transmission, the buffer/pause-frame inserter/flow controller 222 resumes the transmission of the MAC frame.

(e) Flow Control in Response to Request from Router 200

The foregoing describes a case where flow control is carried out by sending the PI and PO frames from the router 100. However, similar flow control can be carried out by sending the PI and PO frames from the router 200. That is, the buffer/band controller/pause terminator 221 of router 200 performs monitoring to determine whether the amount of data that has accumulated in its internal buffer has exceeded the first set value. If the amount of accumulated data has exceeded the first set value, then the buffer/band controller/pause terminator 221 instructs the buffer/pause-frame inserter/flow controller 222 on the output side to create the PI frame. In response, the buffer/pause-frame inserter/flow controller 222 creates the PI frame and sends it in the direction of the transmitter 400. The transmitters 400, 300 allow the PI frame to pass and do not terminate it. As a result, the PI frame arrives at the router 200 on the receiving side. Upon detecting the PI frame, the buffer/band controller/pause terminator 221 instructs the buffer/pause-frame inserter/flow controller 222 to halt transmission of the MAC frame. In response to being instructed to halt this transmission, the buffer/pause-frame inserter/flow controller 122 halts the transmission of the MAC frame. As a result, input of the MAC frame to the router 200 stops.

The buffer/band controller/pause terminator 221 of router 200 performs monitoring to determine whether the amount of data that has accumulated in its internal buffer has fallen below the second set value. If the amount of accumulated data has fallen below the second set value because the MAC frame has stopped arriving, then the buffer/band controller/pause terminator 221 instructs the buffer/pause-frame inserter/flow controller 222 on the output side to create the PO frame. In response, the buffer/pause-frame inserter/flow controller 222 creates the PO frame and sends it in the direction of the transmitter 400. The transmitters 400, 300 allow the PO frame to pass and do not terminate it. As a result, the PO frame arrives at the router 100 on the receiving side. Upon detecting the PO frame, the buffer/band controller/pause terminator 121 instructs the buffer/pause-frame inserter/flow controller 122 to start transmission of the MAC frame. In response to being instructed to start this transmission, the buffer/pause-frame inserter/flow controller 122 resumes the transmission of the MAC frame.

(f) Effects and Noteworthy Items

In accordance with the first embodiment described above, a transmitter allows an externally applied flow-control request to pass and allows an external device to carry out flow control. As a result, even if the buffer of the transmitter is of small capacity, flow control is possible. Moreover, discarding of data at the time of flow control can be prevented.

However, there are instances where a malfunction occurs when a PAUSE frame resulting from flow control by the external device (router) and a PAUSE frame resulting from flow control by the transmitter are generated in an overlapping manner. In the first embodiment, there are two routes for the PI frame that implements flow control. One is the route over which the PI frame is sent to the router 100 in a case where the amount of accumulated data in the buffer exceeds the first set value in band control by the buffer & band controller 301 of transmitter 300. The other is the case where the PI frame is allowed to pass to the side of router 100 when the amount of accumulated data in the input buffer of the opposing node (router 200) exceeds the first set value and, hence, the PI frame is sent from the router 200.

No particular problems arise if the lengths of time from generation of the PI frame to generation of the PO frame of the respective routes do not overlap. However, problems do arise if these lengths of time overlap. To cite one example, there are cases where a PO frame is sent from router 200 (or from the band controller 301b of the transmitter) when both router 200 and transmitter 300 are requesting halt of data transfer. In such case the buffer & MAC frame creation unit 306 of transmitter 300 wishes to maintain the flow-control state of the router 100 but cannot do so because the flow-control state is canceled by the request from the router 200 (or by the request from the band controller 301b).

Figure 3:
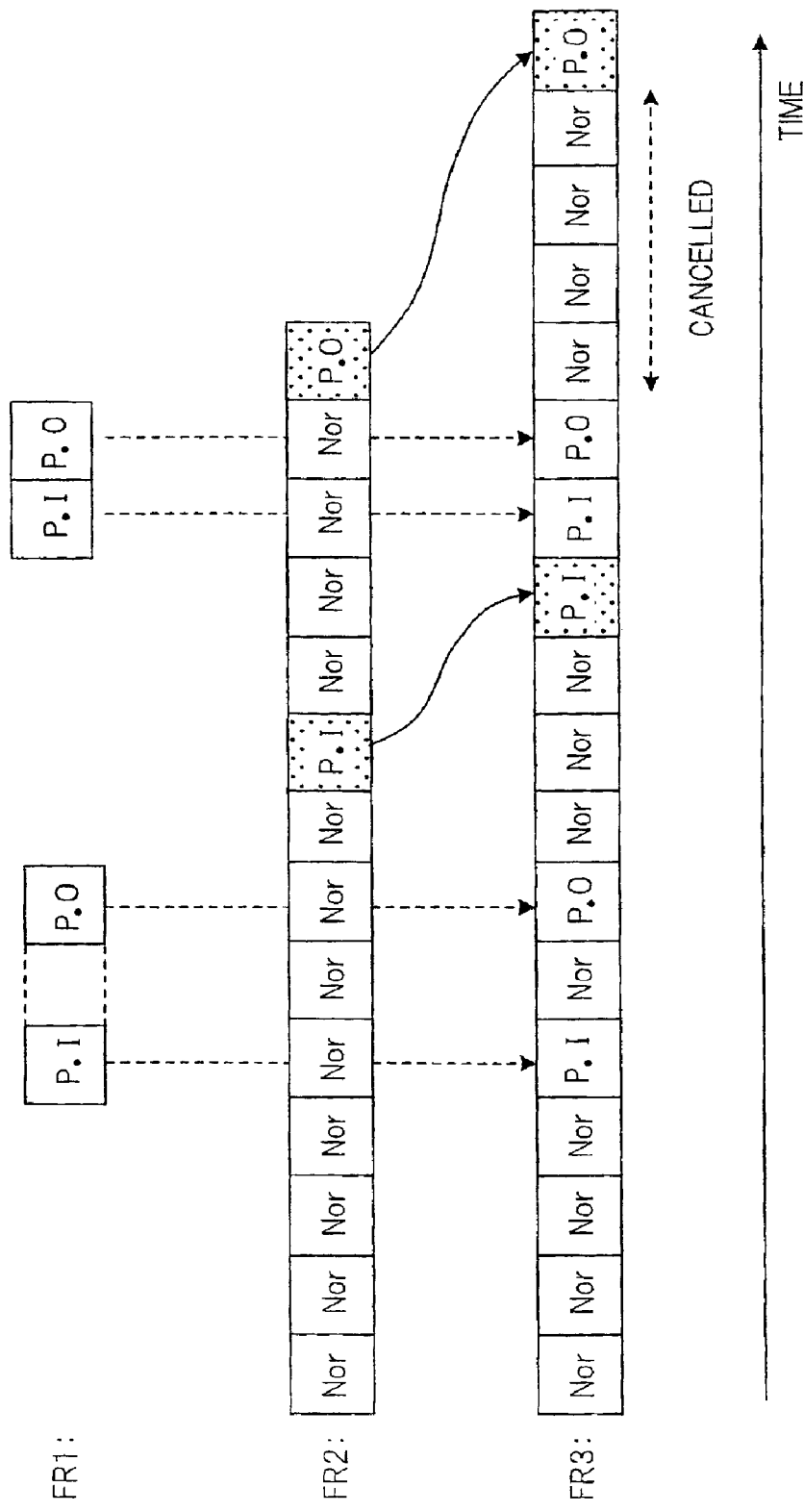
FIG. 3 is a diagram useful in describing a problem that arises with the first embodiment.

FIG. 3 is a diagram useful in describing this problem. Here FR1 represents pause frames (PI and PO frames) output from the pause-frame creation unit 306b in response to a command from the buffer & band controller 301, and FR2 represents a MAC frame sequence sent from the router 200 and including a PI frame and a PO frame. Further, FR3 represents a MAC frame sequence sent from the buffer & MAC frame creation unit 306 to the router 100. The MAC frame sequence FR3 has a format in which the pause frames (PI and PO frames) FR1 output from the pause-frame creation unit 306b are embedded in the MAC frame sequence FR2.

Because the length of time of a pause frame (PI frame, PO frame) first generated by the pause-frame creation unit 306b does not overlap the length of time of a pulse frame (PI frame, PO frame) generated by the router 200, no problem arises. However, the length of time of the pause frame (PI frame, PO frame) generated next overlaps the pause frame (PI frame, PO frame) generated by router 200. If the pause-frame creation unit 306b generates a PO frame in response to a command from the band controller 301b in this case, the combiner 306d, even if a PO frame is not arriving from the router 200, inserts the above-mentioned PO frame into the MAC frame sequence generated by the MAC-frame creation unit 306c and sends this PO frame to the router 100.

As a result, the router 100 resumes transmission of the MAC frame, the MAC frame flows into the buffer on the input side of the router 200 and discarding of data occurs. More specifically, the discarding of data occurs because the inflow of data is resumed before the amount of data accumulated in the buffer on the input side of the router 200 falls below the second set value.

The foregoing relates to a case where a PO frame is generated from the pause-frame creation unit 306b owing to band control by the band controller 301b before a PO frame is sent from the router 200. However, there are also instances where a PO frame is sent from the router 200 first. In such cases the transmitter 300 wishes to maintain the flow-control state of the router 100 but cannot do so because the PO frame from the router 200 passes through the router 100 as is and the flow-control state is canceled. As a consequence, the buffer 301a overflows and data is discarded.

(B) Second Embodiment

Figure 4:
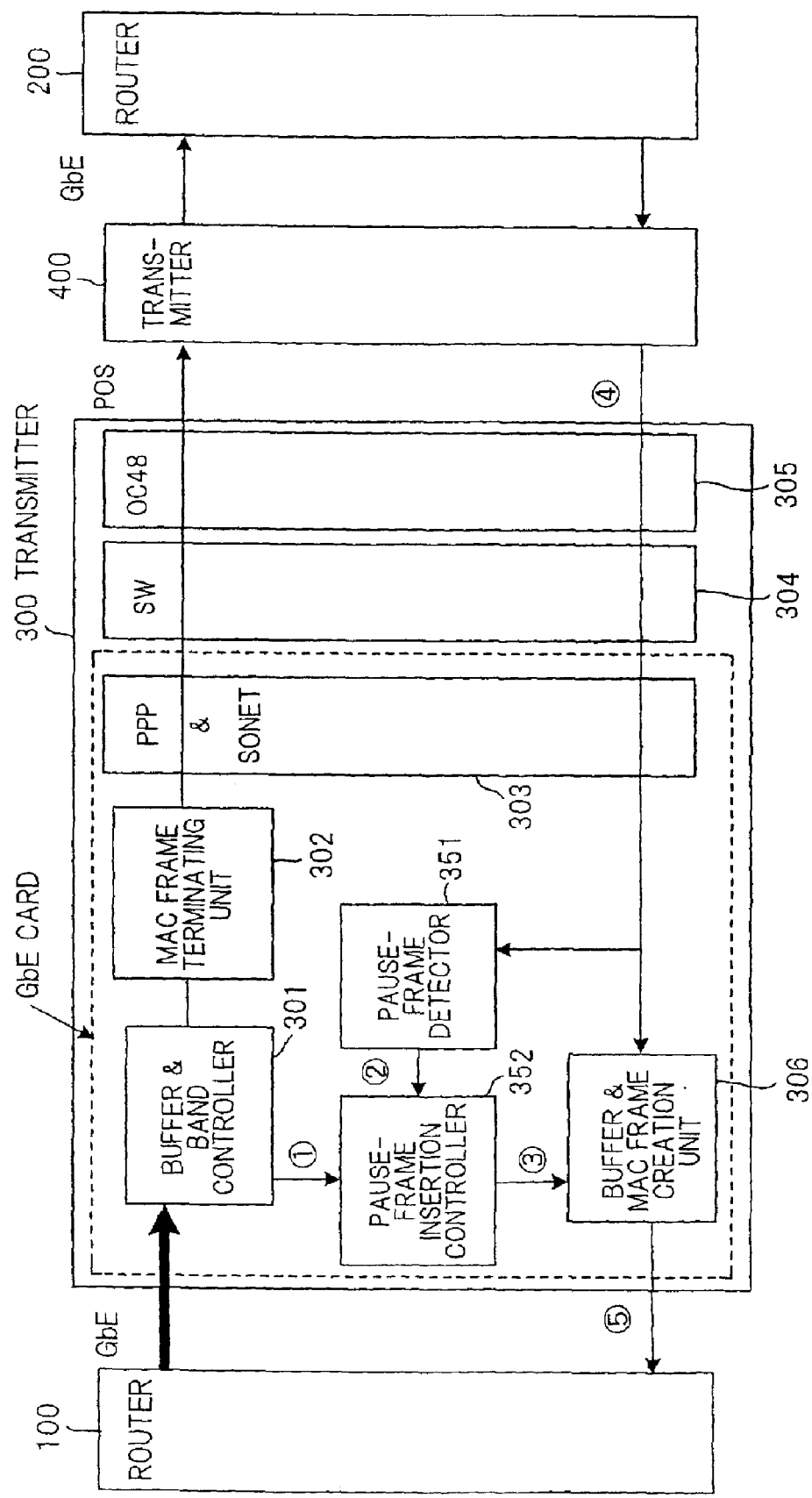
FIG. 4 is a block diagram showing part of a transmitting system according to a second embodiment of the present invention.
Figure 5:
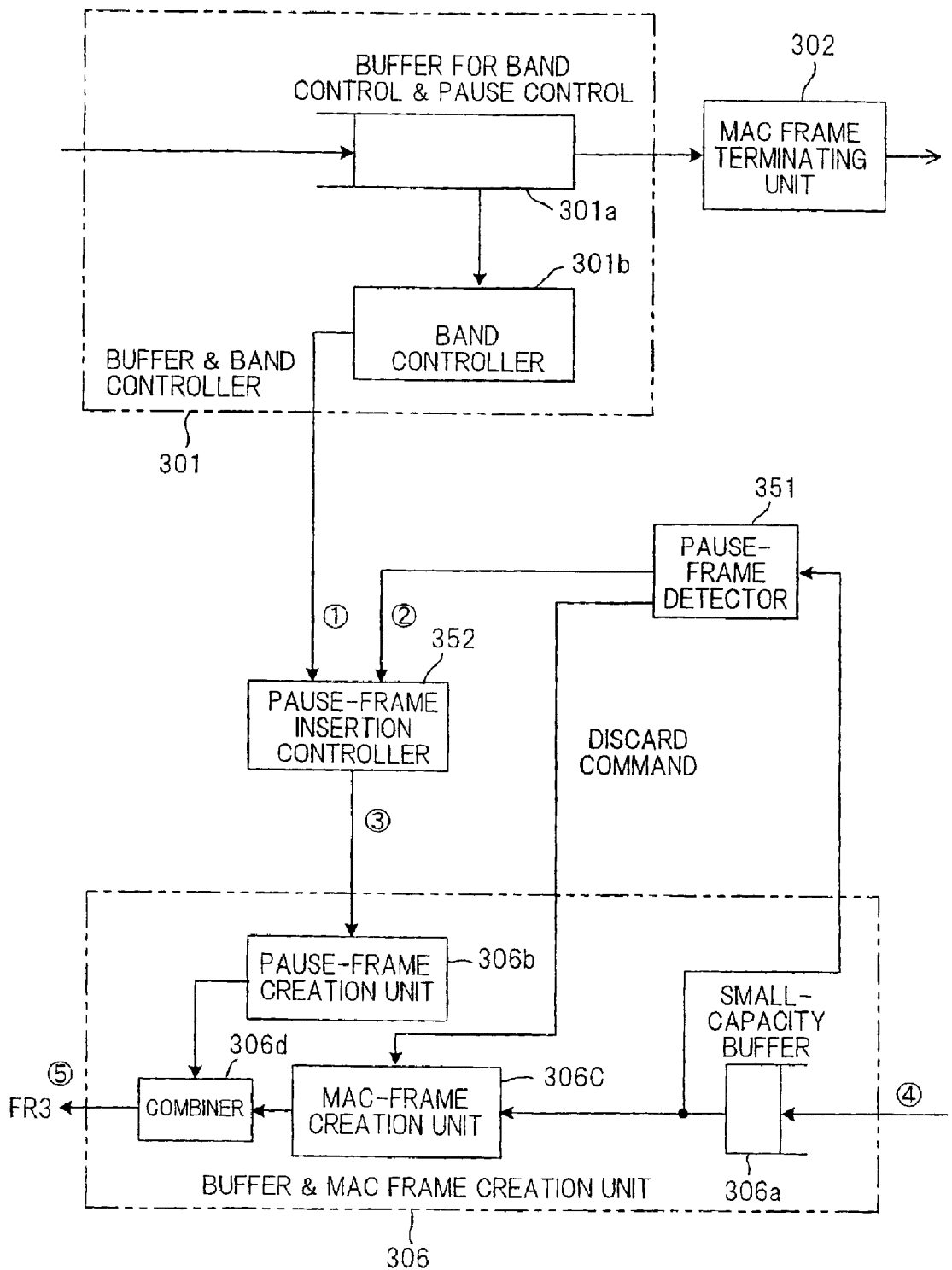
FIG. 5 is a block diagram showing the principal components of a transmitting apparatus according to the second embodiment.

The second embodiment is for the purpose of solving the problem encountered in the first embodiment. FIG. 4 is a block diagram showing part of a transmitting system according to the second embodiment, and FIG. 5 is a block diagram showing the principle components of the transmitting apparatus. Components identical with those of the first embodiment in FIG. 2 are designated by like reference characters. The second embodiment differs from the first in that (1) a pause-frame detector 351 is provided for detecting PI and PO frames sent from the opposing node (router) 200, and (2) a pause-frame insertion controller 352 is provided for instructing the buffer & MAC frame creation unit 306 to insert a PO frame only when creation of a PO frame has been instructed from the band controller 301b and, moreover, a PO frame has been sent from the router 200.

(a) Flow Control of Transmitting Apparatus by Band Control

The band controller 301b of the buffer & band controller 301 monitors the amount of data accumulated in the buffer 301a and outputs a PI-frame creation command if the amount of MAC frame inflow from the router 100 increases and the amount of accumulated data exceeds the first set value. The pause-frame insertion controller 352 saves the PI-frame creation command from the band controller and inputs this command to the buffer & MAC frame creation unit 306. In response to the creation command, the buffer & MAC frame creation unit 306 creates the PI frame and sends it to the router 100. Upon detecting the PI frame, the router 100 halts the transmission of the MAC frame to the transmitter 300 through an operation similar to that of the first embodiment. If as a result the amount of data that has accumulated in the buffer 301a of the transmitter 300 decreases and falls below the second set value, the band controller 301b outputs a PO-frame creation command. In response to this command, the pause-frame insertion controller 352 clears the previously saved PI-frame creation command that entered from the band controller and inputs the PO-frame creation command to the buffer & MAC frame creation unit 306. In response, the buffer & MAC frame creation unit 306 creates the PO frame and sends it to the router 100. Upon detecting the PO frame, the router 100 starts sending the MAC frame to the transmitter 300 through an operation similar to that of the first embodiment.

(b) Flow Control in Response to Request from Router 100

In a manner similar to that of the first embodiment, the router 100 performs monitoring to determine whether the amount of data that has accumulated in the internal buffer on the input side has exceeded the first set value. If the amount of accumulated data has exceeded the first set value, then the router 100 creates the PI frame and sends it in the direction of the transmitter 300. The transmitters 300, 400 allow the PI frame to pass and do not terminate it. As a result, the PI frame arrives at the router 200 on the receiving side. Upon detecting the PI frame, the router 200 halts transmission of the MAC frame and input of the MAC frame to the router 100 stops as a result.

The router 100 performs monitoring to determine whether the amount of data that has accumulated the buffer has fallen below the second set value. If the amount of accumulated data has fallen below the second set value because the MAC frame has stopped arriving, then the router 100 creates the PO frame and sends the frame in the direction of the transmitter 300. The transmitters 300, 400 allow the PO frame to pass and do not terminate it. As a result, the PO frame arrives at the router 200 on the receiving side. Upon detecting the PO frame, the router 200 resumes the transmission of the MAC frame as a result.

(c) Flow Control in Response to Request from Router 200

The foregoing describes a case where flow control is carried out by sending the PI and PO frames from the router 100. However, similar flow control can be carried out by sending the PI and PO frames from the router 200.

The router 200 performs monitoring to determine whether the amount of data that has accumulated in the internal input buffer has exceeded the first set value. If the amount of accumulated data has exceeded the first set value, then router 200 creates the PI frame and sends it in the direction of the transmitter 400. The transmitters 400, 300 allow the PI frame to pass and do not terminate it. That is, upon detecting the PI frame, the pause-frame detector 351 reports the result of detection to the pause-frame insertion controller 352 and instructs that this PI frame be discarded. The pause-frame insertion controller 352 saves the PI-frame creation command from the router 200 and inputs this command to the buffer & MAC frame creation unit 306. In response to creation command, the buffer & MAC frame creation unit 306 creates the PI frame and sends it to the router 100. As a result, the PI frame arrives at the router 100. Upon detecting the PI frame, the router 100 halts the transmission of the MAC frame in a manner similar to that of the first embodiment. As a result, input of the MAC frame to the router 200 stops.

The router 200 performs monitoring to determine whether the amount of data that has accumulated in the internal buffer on the input side has fallen below the second set value. If the amount of accumulated data has fallen below the second set value because the MAC frame has stopped arriving, then the router 200 creates the PO frame and sends it in the direction of the transmitter 400. The transmitters 400, 300 allow the PI frame to pass and do not terminate it. That is, upon detecting the PO frame, the pause-frame detector 351 reports the result of detection to the pause-frame insertion controller 352 and instructs that this PO frame be discarded. The pause-frame insertion controller 352 clears the previously saved PI-frame creation command that entered from the router 200 and inputs the PO-frame creation command to the buffer & MAC frame creation unit 306. In response to the creation command, the buffer & MAC frame creation unit 306 creates the PO frame and sends it to the router 100. As a result, the PO frame arrives at the router 100. Upon detecting the PO frame, the router 100 resumes the transmission of the MAC frame in a manner similar to that of the first embodiment. The MAC frame enters the router 200 as a result.

(d) Band Control and Flow Control in Response to Request from External Device

Assume that the router 100 is performing flow control (halting the transmission of the MAC frame) by a PI frame based upon band control or a PI frame from the router 200. If creation of a PI frame is commanded from the band controller 301b or if creation of a PI frame is commanded from the pause-frame detector 351 in this case, then the pause-frame insertion controller 352 saves the PI-frame creation command. Since flow control is already being carried out, however, the buffer & MAC frame creation unit 306 is not instructed to create a PI frame.

Figure 6:
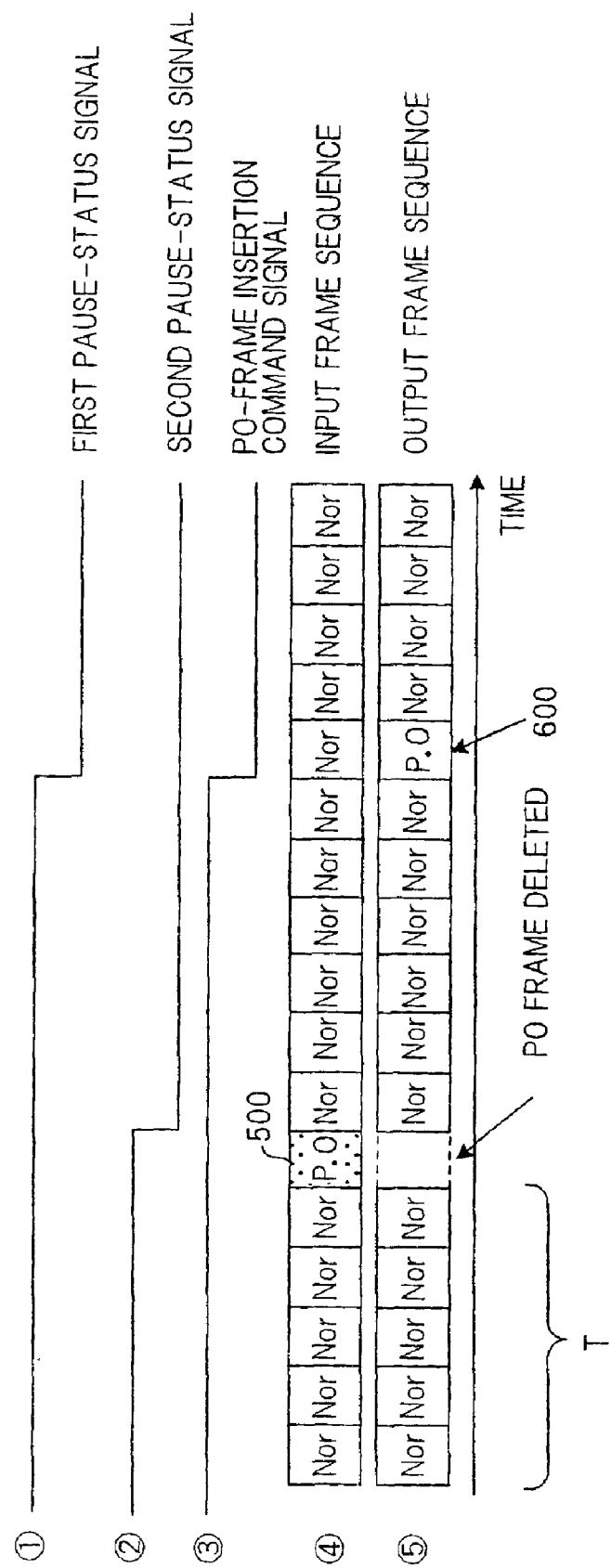
FIG. 6 is a diagram (time chart) useful in describing flow control according to the second embodiment.
Figure 7:
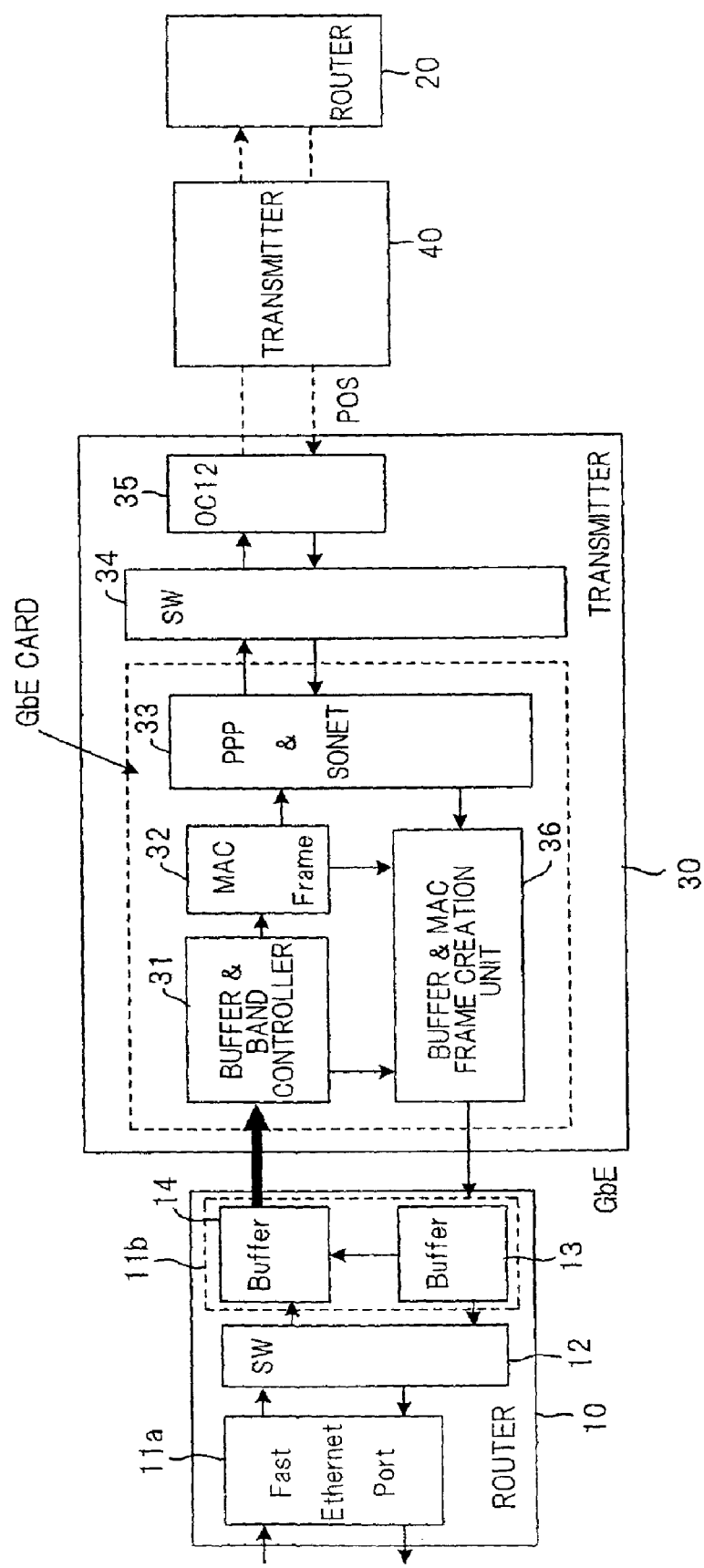
FIG. 7 is a block diagram showing part of a transmitting system useful in describing flow control according to the prior art.
Figure 8:
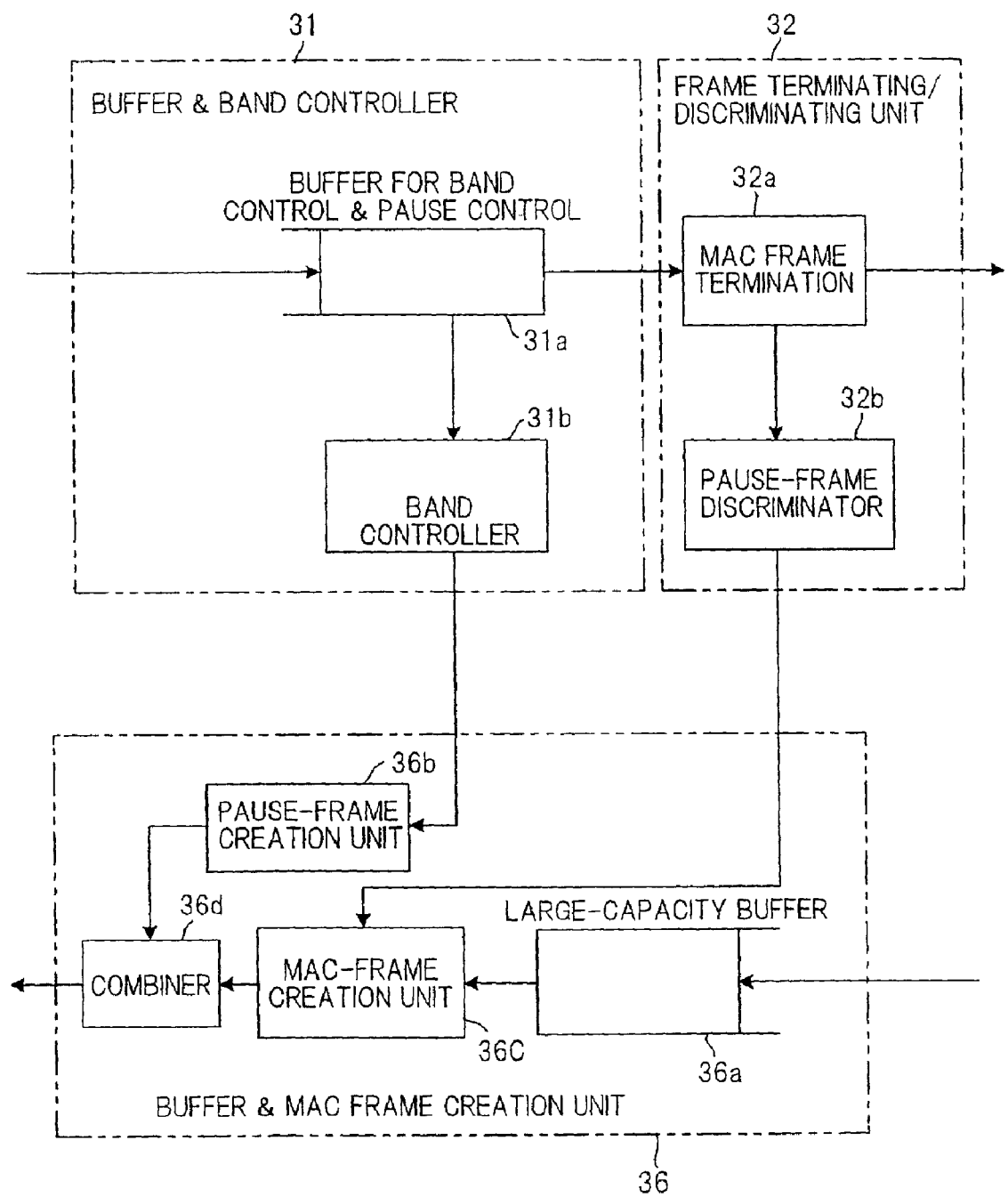
FIG. 8 is a block diagram showing the principal components of a transmitting apparatus according to the prior art.

FIG. 6 is a diagram useful in describing flow control according to the second embodiment. An initial length of time T indicates a state that prevails after creation of PI frames has been commanded from both the band controller 301b and pause-frame detector 351. ① represents a first pause status signal. This signal attains the high level in response to a PI-frame creation command from the band controller 301b and reverts to the low level in response to a PO-frame creation command from the from the band controller 301b. ② represents a second pause status signal. This signal attains the high level when the pause-frame detector 351 detects a PI frame sent from the router 200 and commands creation of the PI frame, and reverts to the low level when the pause-frame detector 351 detects a PO frame sent from the router 200 and commands creation of the PI frame. ③ represents a PO-frame insertion command signal. At the low level, this signal instructs the buffer & MAC frame creation unit 306 to insert a PO frame. This signal attains the low level when both the first and second pause status signals revert to the low level. ④ represents a frame sequence that enters from the a PPP & SONET unit 303, and ⑤ a frame sequence output from the buffer & MAC frame creation unit 306.

If a PO frame 500 is sent from the router 200 under conditions in which both the band controller 301b and pause-frame detector 351 have designated PI-frame creation and the router 100 is performing flow control (length of time T), the pause-frame detector 351 detects the above-mentioned PO frame from the frame sequence, instructs that data be discarded and instructs the pause-frame insertion controller 352 to perform PO-frame creation.

The pause-frame insertion controller 352 sends the second status signal ② to the low level in response to the PO-frame creation command. However, since the first status signal ① is at the high level, the pause-frame insertion controller 352 does not instruct that a PO frame be inserted. The router 100 therefore continues exercising flow control and does not send a MAC frame to the side of the transmitter 300.

If the amount of data that has accumulated in the buffer 301a of the buffer & band controller 301 falls below the second set value under these conditions, the band controller 301b instructs the pause-frame insertion controller 352 to perform PO-frame creation. In response to being so instructed, the pause-frame insertion controller 352 sends the first status signal ① to the low level. As a result, the first and second status signals ①, ② both assume the low level and, hence, the pause-frame insertion controller 352 sends the PO-frame insertion command signal ③ to the low level and instructs the buffer & MAC frame creation unit 306 to perform PO-frame insertion.

In response to being so instructed, the buffer & MAC frame creation unit 306 creates a PO frame 600 and sends it to the router 100. As a result, the PO frame 600 arrives at the router 100. Upon detecting this PO frame, the router 100 resumes transmission of the MAC frame in a manner similar to that of the first embodiment. The MAC frame enters the transmitter 300 and router 200 as a result.

The foregoing relates to a case where a PO frame is sent from the router 200 first and the second status signal ② reverts to the low level. However, operation is similar also in a case where a PO frame is output from the band controller 301b first and the first status signal ① reverts to the low level. The PO frame will not be sent to the router 100 unless a PO frame is sent from the router 200 and the second status signal ② also reverts to the low level.

Thus, the second embodiment is such that even if a flow-control request from the router 200 and a flow-control request from within the transmitting apparatus (band controller 301b) are produced in an overlapping manner and flow control is being carried out by the router 100, the router 100 will halt flow control on the condition that both a flow-control halt request from the router 200 and a flow-control halt request from the band controller 301b are produced. As a result, a flow-control malfunction can be prevented from occurring even in a case where a flow-control request from the router 200 and a flow-control request from the band controller 301b are produced in an overlapping manner.

In accordance with the present invention, as described above, the arrangement is such that an externally applied flow-control request is allowed to pass and an external device, e.g., a router, is allowed to perform flow control. This makes it possible to perform flow control in the overall system even if the buffer of a transmitting apparatus is of small capacity. Moreover, discarding of data at the time of flow control can be prevented.

In accordance with the present invention, it is so arranged that a router will halt flow control on the condition that both an externally applied flow-control halt request and a flow-control halt request from within the apparatus are produced. As a result, a flow-control malfunction can be prevented from occurring even in a case where an externally applied flow-control start request and a flow-control start request from the transmitting apparatus are produced in an overlapping manner.

As many apparently widely different embodiments of the present invention can be made without departing from the spirit and scope thereof, it is to be understood that the invention is not limited to the specific embodiments thereof except as defined in the appended claims.

What is claimed is:

1. A transmitting apparatus having a buffer for storing frame data that enters from a first external device, a transceiver for subjecting data read out of the buffer to predetermined transmit processing and sending the processed data to a second external device via a transmission line, and for subjecting a signal that enters from a transmission line to predetermined receive processing and outputting the processed signal, and a frame creation unit for putting the data output from the receive side of the transceiver into the form of a frame and sending the frame to the first external device, said apparatus comprising:

a band controller for monitoring an amount of data stored in the buffer and commanding that a flow-control start request frame be created when the amount of stored data has exceeded a first set value;

a flow-control-frame creation unit for creating a flow-control start request frame and sending it to the first external device on the basis of the command, and for creating a flow-control start request frame and sending it to the first external device without performing flow control when a flow-control start request signal enters from the transmission line; and means for sending a flow-control start request signal to the second external device via the transmission line without performing flow control when a flow-control start request frame enters from the first external device.

2. The apparatus according to claim 1, wherein the first and second external devices are routers, the transmission line is an optical transmission line constituting a synchronous optical network and the routers and transmitting apparatus are connected to each other by a high-speed Ethernet;

transmit processing by said transmitting apparatus assembles a MAC frame into a packet, which is a unit of switching, maps each packet to a payload of an optical synchronization frame after switching and outputs the result to the second external device via the optical transmission line; and receive processing by said transmitting apparatus demaps payload data of an optical synchronization frame on a per-switching-unit basis, forms the demapped data into a MAC frame after switching and sends the result to the first external device.

3. The apparatus according to claim 1, wherein said band controller commands creation of a flow-control halt request frame when the amount of stored data is less than a second set value, and said flow-control-frame creation unit creates a flow-control halt request frame and sends it to the first external device on the basis of the command, and creates a flow-control halt request frame and sends it to the first external device when the flow-control stop request signal enters from the transmission line.

4. The apparatus according to claim 3, wherein the first and second external devices are routers, the transmission line is an optical transmission line constituting a synchronous optical network and the routers and transmitting apparatus are connected to each other by a high-speed Ethernet;

transmit processing by said transmitting apparatus assembles a MAC frame into a packet, which is a unit of switching, maps each packet to a payload of an optical synchronization frame after switching and outputs the results to the second external device via the optical transmission line; and receive processing by said transmitting apparatus demaps payload data of an optical synchronization frame on a per-switching-unit basis, forms the demapped data into a MAC frame after switching and sends the result to the first external device.

5. A transmitting apparatus having a buffer for storing frame data that enters from a first external device, a transceiver for subjecting data read out of the buffer to predetermined transmit processing and sending the processed data to a second external device via a transmission line, and for subjecting a signal that enters from a transmission line to predetermined receive processing and outputting the processed signal, and a frame creation unit for putting the data output from the receive side of the transceiver into the form of a frame and sending the frame to the first external device, said apparatus comprising:

a band controller for monitoring an amount of data stored in the buffer and commanding that a flow-control start request frame and a flow-control halt request frame be created based upon the amount of stored data and that these frames be sent to the first external device;

a detector for detecting a flow-control start request and a flow-control halt request from a signal from the second external device that enters from a transmission line;

means for controlling a first state which is set by a flow-control start request and reset by a flow control halt request from said band controller and for controlling a second state which is set by a flow-control start request and reset by a flow-control halt request received via the transmission line; and a flow-control-frame creation unit for (1) creating a flow-control start request frame based upon the command from said band controller or based upon the flow-control start request received from the transmission line and sending the flow-control start request frame to the first external device, (2) for creating a flow-control halt request frame and sending it to the first external device when said second state is set and creation of the flow-control halt request frame has been designated from said band controller and (3) for creating a flow-control halt request frame and sending it to the first external device when said first state is set and the flow-control halt request has been detected from the signal that enters from the transmission line.

6. The apparatus according to claim 5, wherein the first and second external devices are routers, the transmission line is an optical transmission line constituting an synchronous optical network and the router and transmitting apparatus are connected to each other by a high-speed Ethernet;

transmit processing by said transmitting apparatus assembles a MAC frame into a packet, which is a unit of switching, maps each packet to a payload of an optical synchronization frame after switching and outputs the result to the second external device via the optical transmission line; and receive processing by said transmitting apparatus demaps payload data of an optical synchronization frame on a per-switching-unit basis, forms the demapped data into a MAC frame after switching and sends the result to the first external device.

7. The apparatus according to claim 5, wherein said flow-control-frame creation unit exercises control in such a manner that flow-control start request frames will not be transmitted to the first external device in an overlapping fashion.

8. The apparatus according to claim 7, wherein the first and second external devices are routers, the transmission line is an optical transmission line constituting an synchronous optical network and the router and transmitting apparatus are connected to each other by a high-speed Ethernet;

transmit processing by said transmitting apparatus assembles a MAC frame into a packet, which is a unit of switching, maps each packet to a payload of an optical synchronization frame after switching and outputs the result to the second external device via the optical transmission line; and receive processing by said transmitting apparatus demaps payload data of an optical synchronization frame on a per-switching-unit basis, forms the demapped data into a MAC frame after switching and sends the result to the first external device.

9. A method of controlling flow of a transmitting apparatus having a buffer for storing frame data that enters from a first external device, a transceiver for subjecting data read out of the buffer to predetermined transmit processing and sending the processed data to a second external device via a transmission line, and for subjecting a signal that enters from a transmission line to predetermined receive processing and outputting the processed signal, and a frame creation unit for putting the data output from the receive side of the transceiver into the form of a frame and sending the frame to the first external device, said method comprising the steps of:

monitoring an amount of data stored in the buffer and commanding that a flow-control start request frame be created when the amount of stored data has exceeded a first set value;

creating a flow-control start request frame and sending it to the first external device when the command enters or when a flow-control start request signal enters from the transmission line, and causing the first external device to execute flow control; and when a flow-control start request frame enters from the first external device, sending a flow-control start request signal to the second external device via the transmission line and causing the second external device on to execute flow control.

10. A method of controlling flow of a transmitting apparatus having a buffer for storing frame data that enters from a first external device, a transceiver for subjecting data read out of the buffer to predetermined transmit processing and sending the processed data to a second external device via a transmission line, and for subjecting a signal that enters from a transmission line to predetermined receive processing and outputting the processed signal, and a frame creation unit for putting the data output from the receive side of the transceiver into the form of a frame and sending the frame to the first external device, said method comprising the steps of:

monitoring an amount of data stored in the buffer and commanding that a flow-control start request frame and a flow-control halt request frame be created based upon the amount of stored data and that these frames be sent to the first external device;

detecting a flow-control start request and a flow-control halt request from a signal that enters from the second external device via a transmission line;

controlling a first state which is set by a flow-control start request and reset by a flow-control halt request from said band controller and a second state which is set by a flow-control start request and reset by a flow-control halt request received from the transmission line; and creating a flow-control start request frame and sending it to the first external device when creation of the flow-control start request frame is commanded or when the flow-control start request is detected from the signal that enters from the transmission line;

creating a flow-control halt request frame and sending it to the first external device when said second state is set and creation of the flow-control halt request frame has been commanded; and creating a flow-control start request frame and sending it to the first external device when said first state is set and the flow-control halt request has been detected from the signal that enters from the transmission line.

11. The method according to claim 10, wherein when a flow-control start request frame has entered from the first external device, a flow-control start request signal is sent to the second external device via the transmission line, without flow control being performed, and said second external device is caused to execute flow control.

* * * * *